(12) United States Patent
Bohn

(10) Patent No.: US 6,639,583 B1
(45) Date of Patent: Oct. 28, 2003

(54) USER INTERFACE UTILIZING A COMPUTER POINTING DEVICE WITH INFRARED BRIDGE

(75) Inventor: David D Bohn, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/544,513

(22) Filed: Apr. 6, 2000

(51) Int. Cl.[7] ................................................. G09G 5/08
(52) U.S. Cl. ...................... 345/157; 345/163; 345/164; 345/165; 345/166; 345/167
(58) Field of Search ............................... 345/32, 39, 46, 345/81, 82, 84, 157, 163–168, 170, 175, 176, 183, 207, 700, 748, 764, 810, 835, 836

(56) References Cited

U.S. PATENT DOCUMENTS

| | | | | |
|---|---|---|---|---|
| 5,664,228 A | * | 9/1997 | Mital | 395/882 |
| 5,870,080 A | * | 2/1999 | Burnett et al. | 345/163 |
| 5,877,745 A | * | 3/1999 | Beeteson et al. | 345/156 |
| 5,926,756 A | * | 7/1999 | Piosenka et al. | 455/418 |
| 6,010,257 A | * | 1/2000 | Petteruti et al. | 400/88 |
| 6,107,984 A | * | 8/2000 | Naka et al. | 345/99 |
| 6,137,479 A | * | 10/2000 | Olsen et al. | 345/169 |
| 6,157,376 A | * | 12/2000 | Eglit | 345/213 |
| 6,295,051 B1 | * | 9/2001 | Kanevsky et al. | 345/163 |
| 6,421,235 B2 | * | 7/2002 | Ditzik | 361/683 |

OTHER PUBLICATIONS

IEEE 1284.3 and 1284.4 Advances in High speed parallel port performance qand port sahring 1994.*
Cameo Reciept Printer, Cmtec information systems inc. Feb. 200.*
Steve Mritsugu and DTR business systems, Using Unix, 1998, Chepter 5, pp. 1,2.*
Robert Cowart, Mastering Windows 3.1, 1992, Sybex Inc. first edition, index p. 944, Chapter 1, p. 7.*
Microsoft Press, Computer Dictionary, 1993, $2^{nd}$ edition, Graphic mode, p. 185.*
"Welcome to IrDA," IrDA . . . The Smart Wireless Link, http://www.irda.org/, pp. 1–2.
"IrDA Data Link Design Guide," by Hewlett Packard, pp. i–vi, pp. 1–22.

* cited by examiner

*Primary Examiner*—Amare Mengistu
*Assistant Examiner*—Prabodh M. Dharia
(74) *Attorney, Agent, or Firm*—Alexander J. Neudeck

(57) ABSTRACT

A pointing device integrates an IR transceiver into the pointing device. An infrared communication link may then be established between another device and the IR transceiver on the pointing device. The pointing device then relays communication between the host computer and the other device along its cable to the host computer. A user interface involves placing the cursor of a graphical user interface over an icon or other area of the screen. Communications initiated by the user are then sent to that area of the screen, or an action indicated by the icon is taken.

6 Claims, 4 Drawing Sheets

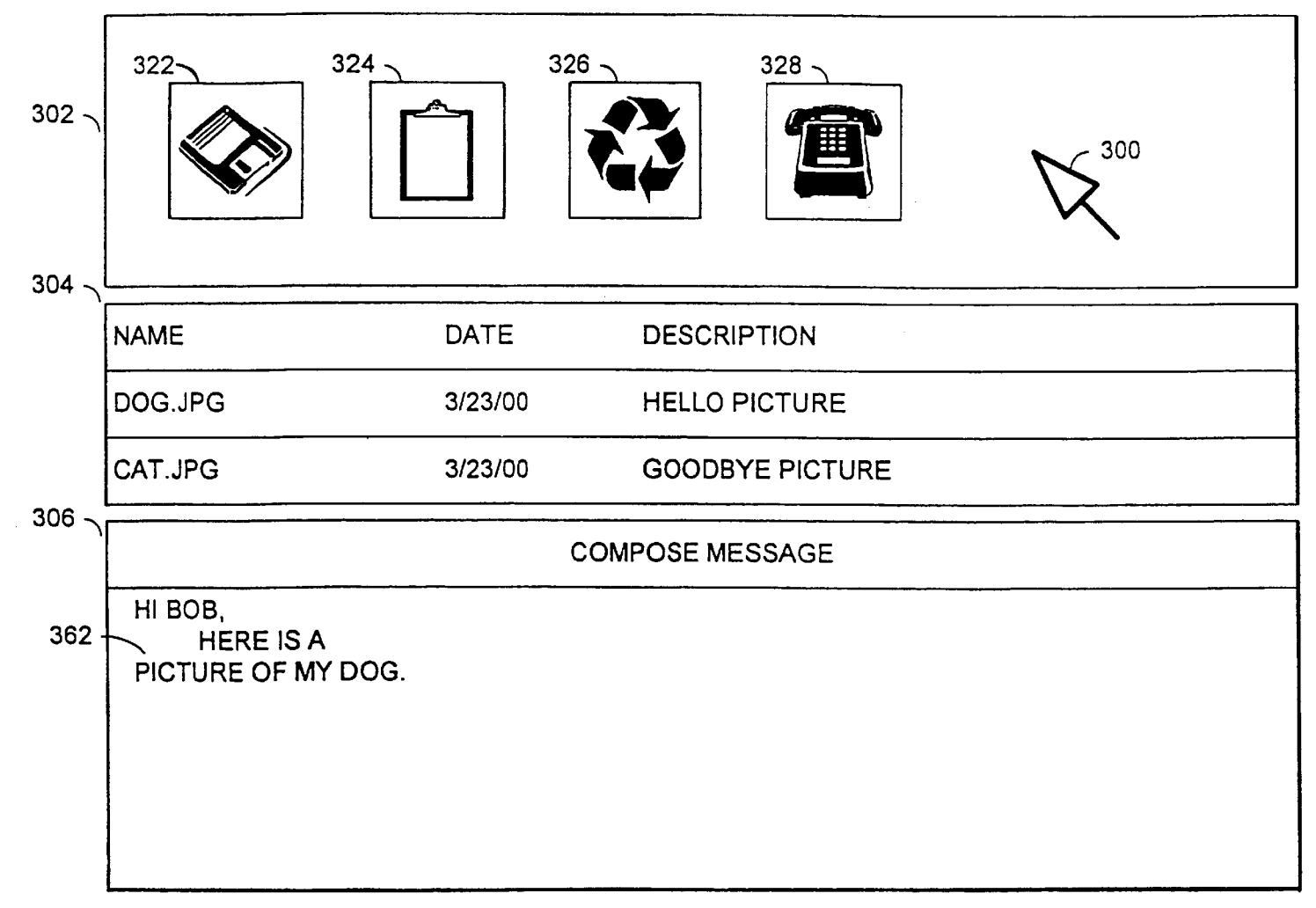

| NAME | DATE | DESCRIPTION |
|---|---|---|
| DOG.JPG | 3/23/00 | HELLO PICTURE |
| CAT.JPG | 3/23/00 | GOODBYE PICTURE |

COMPOSE MESSAGE

HI BOB,
    HERE IS A
PICTURE OF MY DOG.

FIG.3

USER INTERFACE UTILIZING A COMPUTER POINTING DEVICE WITH INFRARED BRIDGE

CROSS-REFERENCE TO RELATED APPLICATIONS

A related copending United States patent applications commonly owned by the assignee of the present document and incorporated by reference in its entirety into this document is being filed in the United States Patent and Trademark Office on or about the same day as the present application. This related application is Hewlett-Packard docket number 10001665-1, Ser. No. 09/544,527 and is titled "COMPUTER POINTING DEVICE WITH INFRARED COMMUNICATION BRIDGE."

FIELD OF THE INVENTION

This invention relates generally to graphical user interfaces more particularly to using a graphical user interface with a pointing device that provides an infrared data communication link between a computer and another device.

BACKGROUND OF THE INVENTION

Infrared light (IR) transceivers are a part of many computer systems, peripherals, personal digital assistants (PDA's), and portable electronic devices such as digital cameras, cellular phones, and handheld scanners. These IR transceivers allow wireless, line-of-sight communication to take place between two devices that are each equipped with an IR transceiver. For example, a digital camera may be equipped with an IR transceiver to allow it to download pictures to a computer also equipped with an IR transceiver. Since the communication is wireless, a user does not have to connect any wires or cables to initiate a download. Furthermore, since there is no dedicated cable, other IR equipped devices may also communicate with the computer using the computer's single IR port. To facilitate the use of IR technology, several key producers and sellers of IR equipped devices and IR transceivers have teamed up to form an industry standards organization. This organization is The Infrared Data Association (IrDA). IrDA is an International Organization headquartered in Walnut Creek, Calif. that creates and promotes interoperable, low cost infrared data interconnection standards that support a walk-up, point-to-point user model. These standards support a broad range of appliances, computing and communications devices.

Many of the IR transceivers on devices today are located on the main chassis. In the case of a personal computer, this means the IR transceiver is located on the CPU enclosure. However, because of shrinking offices, and decreasing availability of desk space, many users would like to locate the CPU enclosure off of the desktop. This presents a problem with IR equipped computers because the IR transceiver on the CPU enclosure is no longer in a position that is convenient for line-of sight communication. Furthermore, even when the CPU enclosure is placed on the desktop, other peripherals (such a keyboard) or desktop clutter (such as soda cans, or loose papers) may obscure the IR transceiver or they may prevent the other device from being placed in a convenient place that has a clear line-of-sight path to the IR transceiver on the CPU enclosure.

A solution to many of these problems is described in a related application titled "COMPUTER POINTING DEVICE WITH INFRARED COMMUNICATION BRIDGE" Ser. No. 09/544,527, Hewlett-Packard docket number 10001665-1, filed on or about the same day as the present application and assigned to the same assignee as the present application. This application discloses a computer mouse or other moveable computer pointing device with an integrated IR transceiver.

However, the integration of the IR transceiver into the pointing device does not address the problem of an easy to use and intuitive user interface for transferring data between the other device and the host computer via the IR transceiver in the pointing device.

SUMMARY OF THE INVENTION

An embodiment of a user interface incorporating the invention involves placing the cursor of a graphical user interface over an icon or other area of the screen. When communications are initiated by the user, then the data sent across the infrared interface is placed in that area of the screen, or, if the area of the screen was an icon, an action indicated by the icon is taken.

Other aspects and advantages of the invention will become apparent from the following detailed description, taken in conjunction with the accompanying drawings, illustrating by way of example the principles of the invention.

BRIEF DESCRIPTION OF THE DRAWINGS

FIG. 3 is an illustration showing several screen elements that may appear in a graphical user interface.

DETAILED DESCRIPTION OF THE PREFERRED EMBODIMENTS

Figure 1:
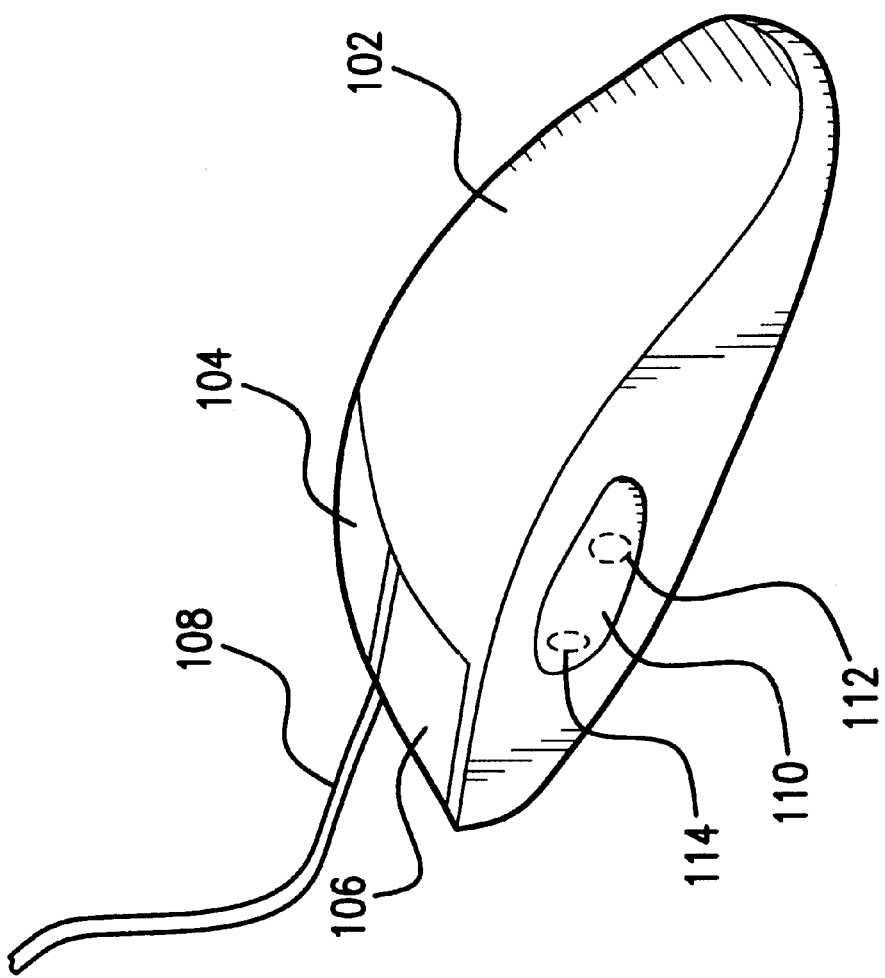
FIG. 1 is an illustration of a computer mouse with an integrated IR transceiver to bridge communication between an IR link and a cable link to a host computer.

FIG. 1 is an illustration of a computer mouse with an integrated IR transceiver to bridge communication between an IR link and a cable link to a host computer. In FIG. 1, mouse 102 includes buttons 104 and 106. Mouse 102 also includes an integrated IR transceiver that sends and receives data using infrared light through IR transparent window 110. Mouse cable 108 is an interface to the host computer that electrically connects the mouse to a host computer providing a communication path between the computer and the mouse. Alternatively, this interface could be wireless using radio waves or other form of wireless communication. Integrated IR transceiver includes an IR transmitter 112 and an IR receiver 114.

When oriented properly, the integrated IR transceiver included in mouse 102 can establish and IR communication link with another IR equipped device. Data sent and received via this link is relayed via cable 108 to and from a host computer. The host computer controls the IR transceiver included in mouse 102 just as if the IR transceiver was on the host computer chassis. Cable 108 may include more wires than a standard mouse cable with these extra wires carrying data to and from the IR transceiver. Alternatively, data to and from the IR transceiver may take place using the existing serial lines but with some protocol extensions to differentiate mouse data from IR transceiver data.

Figure 2:
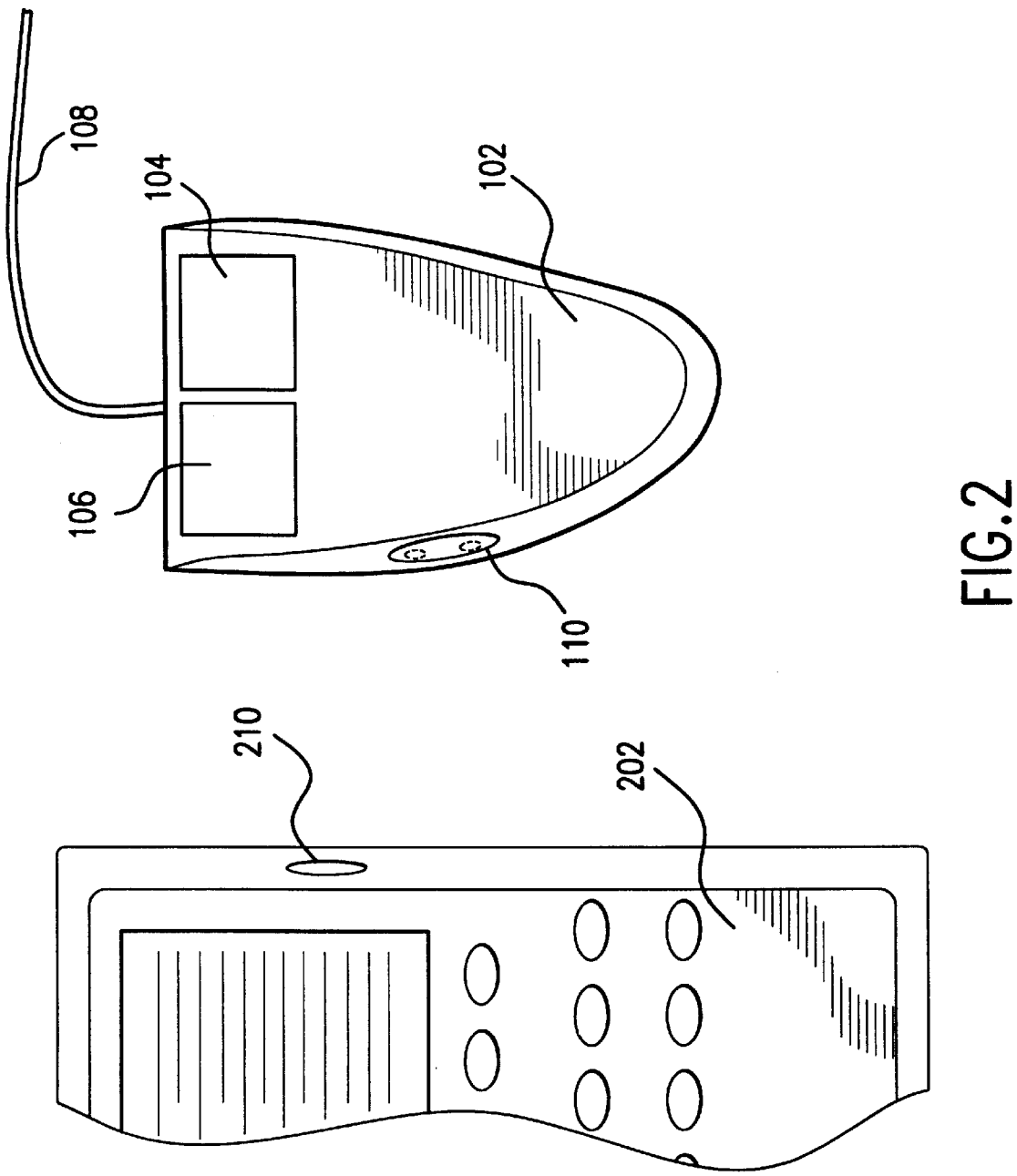
FIG. 2 is an illustration of a computer mouse with an integrated IR transceiver oriented to communicate with another device.

FIG. 2 is an illustration showing an example orientation of a computer mouse with an integrated IR transceiver communicating with another device. Mouse 102 includes buttons 104 and 106 an integrated IR transceiver, IR transparent window 110, and cable 108. Device 202 with an IR transceiver and IR transparent window 210 is placed in a convenient location. Mouse 102 is placed and oriented so that IR transparent window 110 and IR transparent window 210 have a line-of-sight relationship. This allows the integrated IR transceivers in mouse 102 and device 202 to establish communication.

FIG. 3 helps illustrate a user interface for use with a mouse with an integrated IR transceiver. In FIG. 3, there are several elements that may appear in a typical graphical user interface (GUI). A cursor 300 is moved around the screen or window of the GUI. The screen or window of the GUI is also divided into three sections 302, 304, 306. Section 302 is a tool bar that contains buttons 322, 324, 326, 328 with icon representations of several actions that may be taken. For example, button 322 shows an icon of a disk. The action taken when this button is activated would be to save something to a disk. Button 324 shows an icon of a clipboard. The action taken when this button is activated would be to copy something to the clipboard. Button 326 shows a recycle symbol. The action taken when this button is activated would be to move it to the recycle bin. Button 328 shows an icon of a telephone. The action taken when this button is activated might be to send a copy of an item via facsimile or modem.

Section 304 shows a listing of files. In 304, these are shown in a text form. However, this listing could also take the form of iconic representations. Section 308 is an entry box. Section 308 contains subsection 362 where text is displayed as the user types it or other objects (such as pictures) may be displayed when the user indicates in some appropriate manner that they should be inserted.

The user interface for use with a mouse with an integrated IR transceiver involves sending the file or other data communicated via the integrated IR transceiver on the mouse to the application or object represented by the GUI that is underneath the current location of the cursor. For example, say the user is writing a document into entry box 308 and wants to insert an image from a digital camera into the document. The user would locate the mouse somewhere over subsection 362 and then send the image to the host computer via the IR transceiver integrated into the mouse. Buttons or other user interface devices on the camera or host computer keyboard could be used to initiate the transfer without disturbing the position of the mouse. Another example would be attaching a file from a PDA to a file on the host computer. This would involve placing the cursor over the filename (or icon) of the file on the host computer and then initiating the transfer. In FIG. 3, the cursor would be positioned over a filename in the list of section 304 and then initiating the transfer. A last example would be to take some action with the data immediately. This would involve placing the cursor over a button or icon representing that action and then initiating the transfer. In FIG. 3, the cursor would be placed over one of the buttons of section 302 and then the transfer initiated. If the cursor was placed over button 322 the host computer would save the transferred data to disk. If the cursor was placed over button 324 the host computer would send the data to the clipboard. If the cursor was placed over button 326 the data would be sent to the recycle bin to be thrown away. Finally, if the cursor was placed over button 328 the data might be sent via a modem or faxed.

Figure 4:
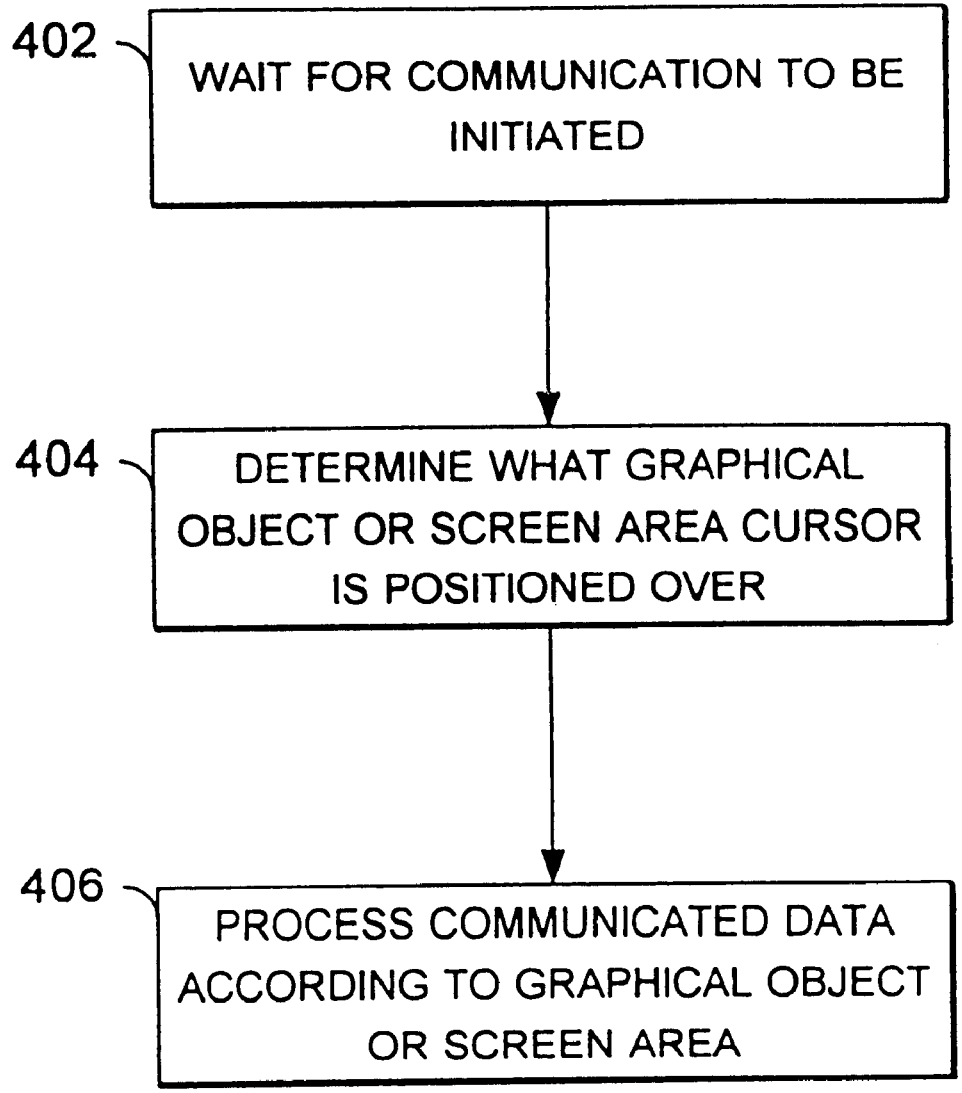
FIG. 4 is a flowchart illustrating steps to direct data received over an IR transceiver on a computer pointing device to the location, or take the action, indicated by the position of the cursor on a GUI.

FIG. 4 is a flowchart illustrating steps to direct data received over an IR transceiver on a computer pointing device to the location, or take the action, indicated by the position of the cursor on a GUI. In a step 402, the user interface program waits for communication to be initiated by the user. The user may initiate communication through a keyboard command on the host computer, or a button or other user input means on the other IR equipped device. In a step 404, the position of the cursor with respect to what graphical object or screen area is determined. It is this position that determines what action will be taken, what application needs to process the incoming data, and where that data needs to be stored, and how it is going to be processed. In a step 406, the communicated data is processed according to the graphical object or screen area the cursor was over when the communication was initiated.

From the foregoing it will be appreciated that the invention provides a novel and advantageous interface for handling data from an IR communication bridge. This interface combines the unique features of an IR communication bridge on a computer pointing device with the ease of use of a graphical user interface. This interface also helps prevent disturbance of the line-of-sight communication between the bridge and the other IR equipped device by not requiring the pointing device be touched to initiate the desired processing of the data being communicated.

Although a specific embodiment of the invention has been described and illustrated, the invention is not to be limited to the specific forms or arrangements of parts so described and illustrated. The invention is limited only by the claims.

What is claimed is:

1. A user interface for transferring data between a host computer and another device via an infrared link, comprising:

an infrared bridge integrated into a pointing device communicating with said host computer;

a graphical user interface running on said host computer wherein said graphical user interface executes at least one function of a plurality of possible functions relating to the processing of data that is transferred via said infrared link, wherein said interface executes said at least one function in response to the initiation of a data transfer over said infrared link and a position of a cursor controlled by said pointing device when said data transfer is initiated and wherein said data transfer is initiated in response to a user input to a device that initiates said data transfer over said infrared link and wherein said device is not said host computer;

wherein the position of said cursor displayed on a display screen determines at least one function of said plurality of possible functions that is executed; and wherein said at least one function is to insert an object and said position of said cursor is over an entry box area.

2. The user interface of claim 1 wherein said at least one function is to store said data in a file and said position of said cursor displayed is over an icon.

3. The user interface of claim 1 wherein said at least one function is to transfer data from said host computer to said another device and said position of said cursor is over a representation of a filename.

4. A user interface for transferring data between a host computer and another device via an infrared link, comprising:

an infrared bridge integrated into a pointing device communicating with said host computer;

a graphical user interface running on said host computer wherein said graphical user interface executes at least one function of a plurality of possible functions relating to the processing of data that is transferred via said infrared link, wherein said interface executes said at least one function in response to the initiation of a data transfer over said infrared link and a position of a cursor controlled by said pointing device when said data transfer is initiated and wherein said data transfer is initiated in response to a user input to a device that initiates said data transfer over said infrared link and wherein said device is not said host computer;

wherein the position of said cursor displayed on a display screen determines at least one function of said plurality of possible functions that is executed; and wherein said at least one function is to transfer data to said host computer from said another device and said position of said cursor is over a representation of a filename.

5. The user interface of claim 4 wherein said at least one function is to store said data in a file and said position of said cursor displayed is over an icon.

6. The user interface of claim 4 wherein said at least one function is to transfer data from said host computer to said another device and said position of said cursor is over a representation of a filename.

* * * * *